Oct. 1, 1935.　　　T. C. HARVEY　　　2,016,143
DUMP WAGON
Filed Feb. 8, 1933　　　7 Sheets-Sheet 3

Oct. 1, 1935.  T. C. HARVEY  2,016,143
DUMP WAGON
Filed Feb. 8, 1933   7 Sheets-Sheet 4

Fig. 7.

INVENTOR
Theodore C. Harvey
BY
ATTORNEY

Oct. 1, 1935.  T. C. HARVEY  2,016,143
DUMP WAGON
Filed Feb. 8, 1933  7 Sheets-Sheet 6

INVENTOR
Theodore C. Harvey
BY
ATTORNEY

Patented Oct. 1, 1935

2,016,143

UNITED STATES PATENT OFFICE 2,016,143

DUMP WAGON

Theodore C. Harvey, Philadelphia, Pa.

Application February 8, 1933, Serial No. 655,744

5 Claims. (Cl. 298—24)

This invention relates to dump wagons, the broad object of said invention being to provide a wagon of the class described, which is capable of various operations in order to expedite and facilitate the discharge of the load therefrom in a manner most convenient to the operator as well as minimizing traffic obstruction.

One object is to provide a dump wagon having a bottom discharge and capable of being automatically emptied or unloaded, partially or wholly from either side of the wagon body.

Another object in view, is to provide for emptying the load partially or wholly from the bottom.

Another object in view, is to provide for directing the discharging load toward either side, bottom, front and rear or practically in almost any direction downwardly or inclined from the bottom discharge opening of the load body.

Another object in view, is to provide in connection with a body having the characteristics above referred to, means for vertically raising and lowering the body in relation to the truck frame, without interfering with the discharge of the load under the advantageous conditions above enumerated. The body is adapted to be raised either by hand or motive power.

Another object in view, is to provide means operable either from the operator's compartment or the ground and whereby a plurality of outlets may be separately or simultaneously operated either with the body elevated or lowered.

Another object in view, is to provide means whereby bags or small receptacles can be directly filled by means of a novel arrangement of revolving chute or body extension adapted to discharge to either side of the wagon.

Another object in view, is to provide for delivery of the load whereby the discharging contents may be directed to man-holes, wheel-barrows, trucks, cars or other receptacles placed adjacently to the side of the wagon.

Another object in view is to provide means for weighing and registering the weight of the load, combined with the novel arrangement of riding blocks, which serve to support the body during transportation and prevent injury to the weighing mechanism.

Another object in view, is to provide means near the operator's compartment for operating the vertically movable loading doors.

Another object in view, is to provide means for the carriage of separate units or different materials and permitting separate or combined discharge of said load units.

Another object in view, is to provide means for leveling, stabilizing or distributing the load body contents after part of the load has been discharged and the remainder is carried to a different destination.

Another object in view, is to provide means for quick conversion of the load body when needed, to the original bottom opening or outlet, without the revolving chute.

Another object in view, is to provide means for the sectional removal or assembly of the load body division boards as may be required.

Another object in view, is to provide means for ground control of the revolving chute with the body either elevated or lowered.

Another object in view, is to provide for the adequate height of the discharge outlet for ordinary delivery of the load, reserving the elevation means for unusual requirements in height and distance in conjunction with extension chutes of transferring the load to other vehicles, over fences, onto lawns, etc.

With the above and other objects in view, the invention consists substantially in the combination, construction, location and relative arrangement of parts, all as will appear more fully hereinafter, as shown in the accompanying drawings and as finally pointed out in the appended claims.

In the accompanying drawings:—

Referring now more particularly to the drawings, it will be observed that the wagon body or receptacle for the load as shown is of inverted frusto-pyramidal shape. While this is the preferable shape, it will be understood that the invention or inventions to be described more fully hereinafter are equally applicable to bodies or load receptacles of different shapes than that shown in the drawings, the principal characteristic of the body with which this invention is concerned being that the side walls thereof converge downwardly toward an opening in the bottom of the body. In the drawings the load receiving body is designated generally by the reference numeral 1, the centrally disposed bottom opening or outlet having suitably secured to the perimetral edge thereof a frame member 2, this frame member being more particularly shown in Figure 20. As clearly appears in this figure the frame member 2 is provided with intersecting division strips 4 and 5 whereby to provide a plurality of substantially equal-sized openings 3, each of which constitutes, when the frame 2 is attached to the bottom of the load receptacle 1, a discharge outlet. It will be apparent that by the provision of the four discharge outlets, the material contained in the body may be discharged through any one or more of the said discharge outlets.

Figure 2:
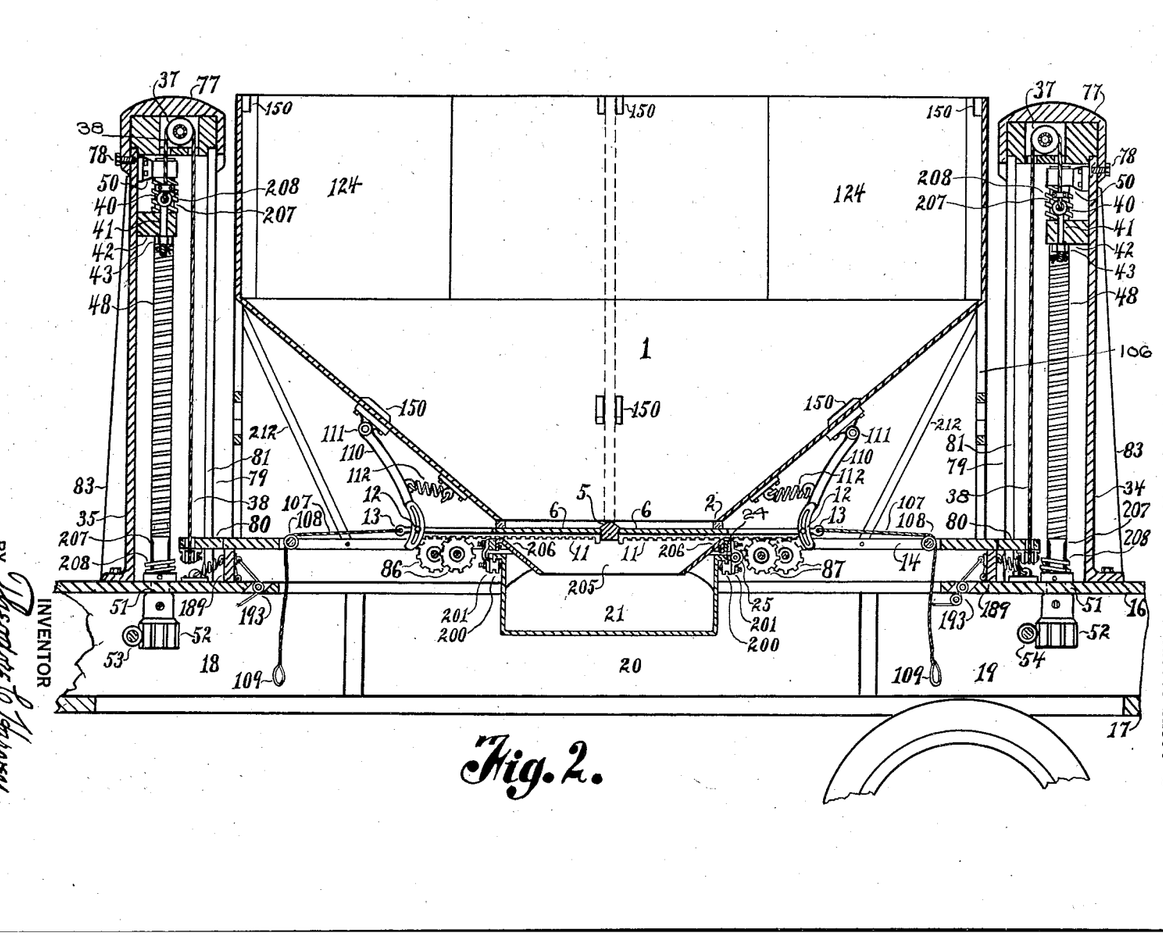
Fig. 2 is a vertical, longitudinal section through the dump wagon, taken along the line A—A of Fig. 3.
Figures 16, 17, 18, 19, 20, 21:
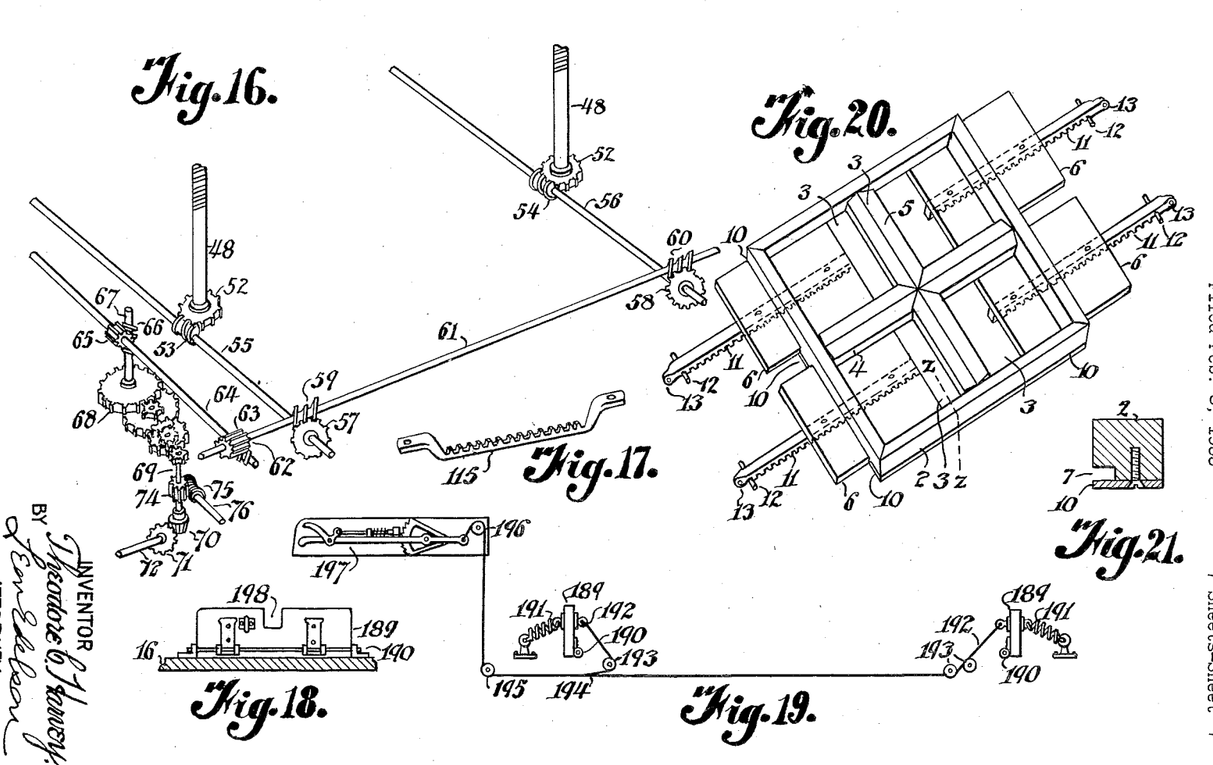
Fig. 16 is a perspective view of part of the hand and motor controlled means for raising and lowering the body of the dump wagon.
Fig. 17 is a detail perspective view of one of the corrugated chute supporting rails.
Fig. 18 is a front elevational view of one of the hinged riding blocks.
Fig. 19 is a diagrammatic view of the riding blocks and the operating means therefor.
Fig. 20 is a perspective view of the bottom trap door frame, showing a portion of the trap door operating means.
Fig. 21 is an enlarged fragmentary cross-sectional view on the line Z—Z of Fig. 20.

As appears most clearly in Figures 2 and 20, each of the discharge outlets 3 thus provided in the bottom of the body is adapted to be opened and closed by a horizontally arranged slidable closure member 6, these closure members 6 being all movable in directions extending longitudinally of the main body 1. As appears most clearly in Figure 21, the closure members 6 are respectively slidable within opposed longitudinally extending rabbets 7 formed in the inner bottom edges of the longitudinally extending side bars of the frame 2 as well as in the opposite bottom edges of the longitudinally extending division strip 4 of said frame, the closure members 6 being respectively retained in slidable position by means of the flat supporting strips 10 which are secured in underlying relation to the bottom surfaces of the longitudinally extending side bars and the longitudinally extending division strip 4 of the frame 2. Fixedly secured to each of the closure members 6 is a longitudinally extending rack bar 11 the toothed edge of which is presented downwardly and the outer free end of which is provided with a laterally extending pin 12 and a terminal eye 13 for purposes which will be apparent hereinafter.

Figure 1:
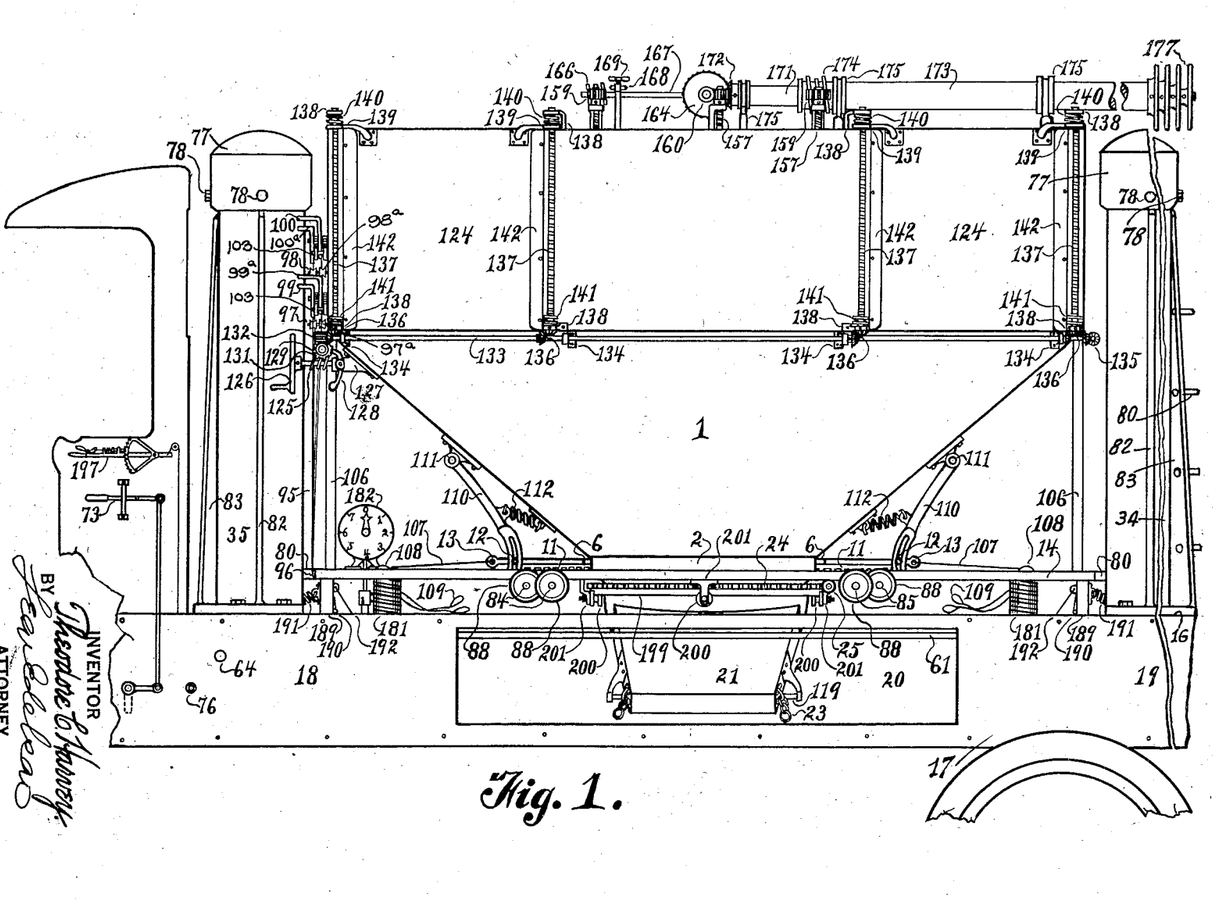
Fig. 1 is a side elevational view of a dump wagon constructed in accordance with and embodying the principles of the present invention.
Figures 8, 10, 11:
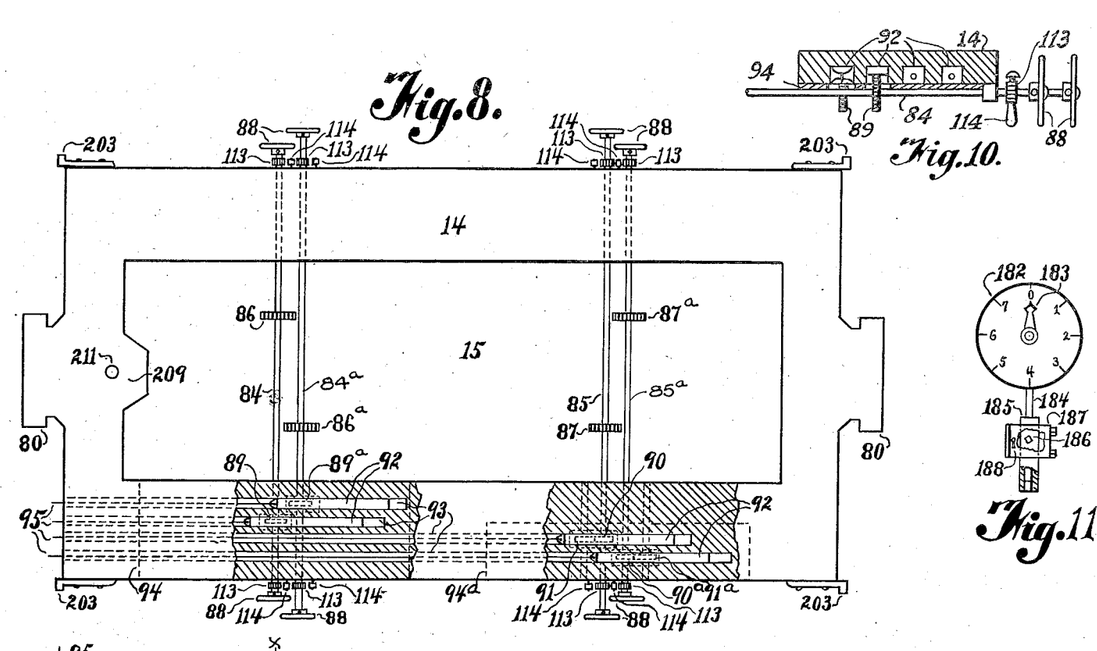
Fig. 8 is a top plan view, partly in section, of the foundation board.
Fig. 10 is a transverse sectional view taken along the line X—X of Fig. 9.
Fig. 11 is a detail broken elevation view of the weight registering mechanism.

As appears most clearly in Figures 1 and 8, the main body 1 rests upon and is directly supported by a foundation board or platform 14 having formed therein an elongated central opening 15. This platform 14 is adapted for vertical movement together with the main body 1 supported thereby by means to be described hereinafter. The platform 14 is, of course, disposed in a substantially horizontal plane above the vehicle frame, the latter comprising an upper frame member 16 and a lower frame member 17. The fore and aft ends of the truck frame are preferably in the form of partially boxed-in sections having the substantially closed side walls 18 and 19, said sections being of such character as to provide an intervening section the opposite side walls of which are open, as at 20. Disposed within the intervening section and suitably secured to the bottom end of the main body 1 is a revoluble discharge chute 21, the truck frame members 16 and 17 being vertically spaced apart a distance sufficient to allow for the desired vertical and rotative movement of the discharge chute 21.

The upper and lower frame members 16 and 17 are respectively of substantially rectangular formation, thus affording openings therein of sufficient size to permit not only a vertical movement of the discharge chute 21 but also a circular movement thereof when the body 1 is in lowered position, the openings 20 in the side walls of the intervening section of the truck frame being of sufficient length and depth as to permit the free movement therethrough of the outer end of the discharge chute. As appears most clearly in Figure 3, the free end of the discharge chute extends somewhat beyond the side limit of the vehicle frame when the chute is directed into position for discharging the load from the side of the vehicle, thereby facilitating the filling of receptacles from either side of the vehicle when the main body 1 is in its lowered position. At the same time, by so arranging the discharge chute that its outer end extends through the opening 20 of the vehicle frame, the attachment of the short flared extension chute 22, such as is shown in Figure 6, is greatly facilitated.

Figures 3, 4, 5, 6:
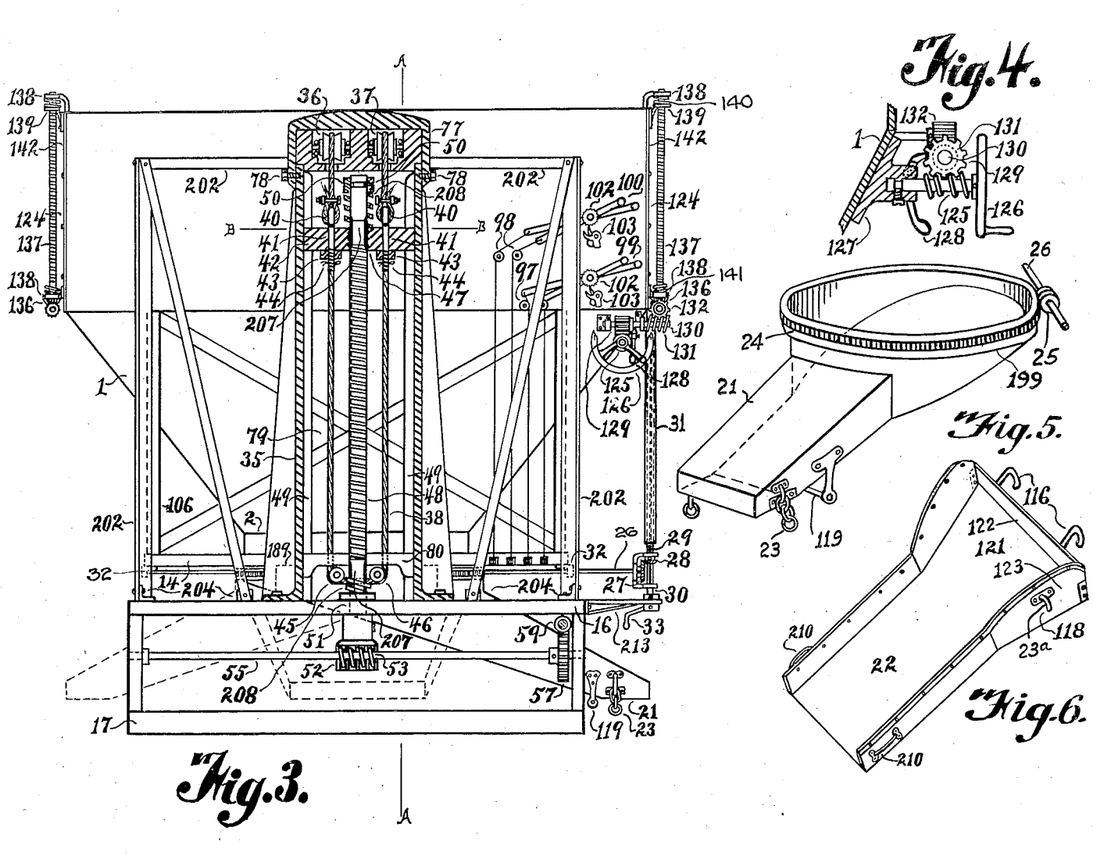
Fig. 3 is a front end elevational view of the dump wagon showing the truck body or double platform arrangement, skeleton body supports, load doors and outlet controls and revolving chute discharge outlet. The front body elevating standard is shown in cross section.
Fig. 4 is a fragmentary cross section showing a portion of the loading door operating means.
Fig. 5 is a detail perspective view of the detachable revolving chute outlet.
Fig. 6 is a similar view of the flared extension chute.

As appears most clearly in Figures 1, 3 and 5, the revoluble discharge chute 21 is provided at opposite sides of the discharge end thereof with a pair of chains 23 to which are adapted to be respectively hooked the hooks 23a arranged upon either side of the flared end of the extension chute 22.

Suitably secured to the upper end of the circular body of the discharge chute 21 is an annular rack bar or worm gear 24 which is adapted for meshing engagement with and actuation by a worm 25 fixed to a transverse shaft 26 the opposite ends of which are journalled, as at 32, (see Figures 3 and 7) to the foundation board or platform 14. Keyed to one end of this shaft 26 is a bevel gear 27 in mesh with a bevel gear 28, the latter being non-rotatably but slidably secured to a vertically extending rotatable shaft 30. This shaft 30, which is provided with a longitudinally extending groove 29 within which the bevel gear 28 is slidably keyed, is suitably encased within a supporting tube or casing 31 which is securely held in position at its upper end by a bracket 32' (see Figure 7) mounted upon the side of the main body 1.

Secured to the lower end of the shaft 30 is an operating handle 33 for effecting the desired rotation of the revoluble discharge chute 21 from the ground regardless of the vertically adjusted position of the main body, it being apparent that as the said body is raised or lowered, the transverse shaft 26 is correspondingly moved therewith as is the bevel gear 28, the latter being constantly in mesh with the bevel gear 27. Preferably, the lower end of the rotatable shaft 30 is journalled within a bracket 213 (see Figure 3) mounted upon the side edge of the vehicle frame member 16.

Mounted upon the upper frame member 16 of the vehicle truck at the fore and aft ends thereof are a pair of uprights or standards 35 and 34. Inasmuch as these standards and their associated parts are substantially alike, only one of them will be described in detail, it being observed, as in Figure 3, that each of said standards has journalled in the upper end thereof a pair of pulleys 36 and 37, these pulleys being arranged for rotation about a common horizontally extending axis. Referring now more particularly to the forward standard 35, as shown in Figure 3, it will be observed that the pulleys 36 and 37 are traversed by a flexible cable 38 which is employed for raising and lowering the main body 1. The free ends of this cable 38 are respectively attached to the eyes 40 formed in the upper ends of a pair of bolts 41 the shanks of which project downwardly through a vertically movable cross piece or block 42, the freely projecting ends of the bolts being respectively provided with nuts 43 threaded thereon. Preferably, these nuts 43 are retained against displacement by cotter pins 44 which pass through apertures suitably provided in the shanks of the bolts.

The two portions of the cable 38 which respectively pass over the pulleys 36 and 37 extend downwardly through suitable apertures provided in the end extension 80 (see Figures 2, 3 and 7) of the foundation board or platform 14, the looped or bight end of the cable being then passed around a pair of pulleys 45 and 46 suitably journalled beneath the said foundation board or platform 14, the pulleys 45 and 46 being respectively arranged for rotation about axes which parallel each other and extend at right angles to the axis of rotation of the pulleys 36 and 37. This arrangement equalizes the strain imposed upon each end of the doubled cable 38. It will be observed that the threaded ends of the bolts 41 project downwardly beyond the cross block 42 a sufficient distance to permit adjustment of the nuts 43 thereon and that by so adjusting these nuts upon their respective bolts the tension upon the cable 38 may be varied as desired at the same time that the foundation board or platform 14 may be leveled with respect to the horizontal plane.

As appears most clearly in Figure 3, the cable block 42 is centrally provided with a threaded aperture 47 through which is threadedly projected a vertically arranged screw 48. The opposite ends of the cross block 42 are respectively accommodated within guide channels 49 formed in the side walls of the upright or standard 35. The upper end of the screw 48 is rotatably journalled within a bearing 50 suitably supported within the upper end of the standard 35. The lower end of the screw 48 is in turn journalled, as at 51, in the upper frame member 16 of the vehicle, said lower end of the screw 48 being provided with a downward extension terminating in a downward extension carrying a worm gear 52.

The worm gear 52 of the forward screw 48 is adapted for meshing engagement with a worm 53 which is fixed to a transversely extending shaft 55 the opposite ends of which are suitably journalled in the side walls of the vehicle frame. The worm gear 52 of the rear screw 48 is similarly adapted for meshing engagement with a worm 54 which is fixed to a similarly journalled cross shaft 56, the cross shafts 55 and 56 being arranged for rotation in a common plane disposed substantially midway between the top and bottom frame members 16 and 17. Respectively secured to corresponding ends of each of the cross shafts 55 and 56 are the gears 57 and 58, (see Figures 3 and 16) the latter gears being respectively in mesh with the worms 59 and 60 commonly carried by a countershaft 61 extending longitudinally above the frame member 17. Secured to this countershaft 61 adjacent the forward end thereof is a worm gear 62 adapted for meshing engagement with a worm 63 fixed to for rotation with a transversely extending shaft 64 to which is secured, preferably intermediately to the ends thereof, a worm gear 65. This latter worm gear 65 is driven by a worm 66 carried by a vertically arranged shaft 67, the lower end of the latter being geared through a chain of meshed gears 68, to a laterally disposed vertical shaft 69, the lower end of which is provided with a bevel gear 70 adapted for meshing engagement with a beveled gear 71 fixed to the end of a longitudinally extending drive shaft 72 adapted for control by a clutch and gear unit (not shown), the operating lever 73 (see Figure 1) of which is situated by the operator's seat. The drive shaft 72 is adapted to be driven by the gears (not shown) suitably connected to a driving motor on the vehicle frame.

From the foregoing, it will be apparent that when it is desired to raise or lower the main body 1 this may be readily accomplished by effecting the rotation in one direction or the other of the drive shaft 72 which will, through the gear arrangements just described, effect the rotation of the longitudinally extending countershaft 61 which in turn, through the cross shafts 55 and 56 and their associated gears, will effect the rotation of the fore and aft screws 48—48 in unison in consequence of which the cross blocks 42—42 will be commonly raised or lowered to correspondingly lower or raise the foundation board or platform 14, the latter being suspended between the looped ends of the cables 38—38.

If desired, the raising or lowering of the foundation board or platform 14 may be effected by hand instead of by the motor (not shown) on the vehicle frame and to this end the vertically extending shaft 69 may be provided with an auxiliary worm gear 74 which is adapted for meshing engagement with a worm 75 fixed to and carried by a laterally projecting shaft 76 the free end of which is formed for connection with a crank handle, any suitable means being employed for maintaining the body 1 in vertically adjusted position, such as a ratchet carried by the laterally projecting shaft 76 for engagement with a pawl or detent (not shown). This alternative arrangement for raising or lowering the body 1 by hand facilitates such operation when the operator is standing on the ground beside the vehicle.

Preferably, the upper ends of the fore and aft standards 35 and 34 are preferably respectively covered by the caps 77 retained in position by means of the screw bolts 78. These standards 35 and 34 are respectively slotted, as at 79, in the faces thereof which present toward each other in order to permit the free vertical movement of the substantially T-shaped extensions 80 provided at either end of the foundation board or platform 14, these extensions being retained within the standards 35 and 34 and guided during the vertical movement of the platform by the vertically extending ribs 81 which define the vertically extending slots 79 in the standards. Preferably, the standards are each strengthened and supported by under and side braces or ribs 82 and 83 (see Figs. 1 and 7).

Referring now more particularly to Figures 1, 2, 8 and 9, it will be observed that the mechanism for operating the bottom trap doors 6 includes a forward pair of transversely extending shafts 84 and 84a and a rearward pair of transversely extending shafts 85 and 85a, each of said shafts being suitably journalled upon the bottom surface of the foundation board or platform 14. The shafts 84 and 84a respectively have fixed thereto the pinions 86 and 86a, while the shafts 85 and 85a have respectively fixed thereto the pinions 87 and 87a, it being observed that the pinions 86, 86a, 87 and 87a are relatively so located that they respectively engage the longitudinally extending rack bars 11 which are respectively secured to the several trap doors 6 (see Figure 20). Secured to the outer extremities of the transversely extending shaft 84 are a pair of hand wheels 88, the transversely extending shafts 84a, 85 and 85a being similarly provided at their opposite extremities with hand wheels. It will be apparent that by virtue of these hand-operated transversely extending shafts and the four sets of hand wheels arranged to either side of the vehicle the opening or closing of any one of the trap doors by an operator stationed at either side of the vehicle is facilitated.

In addition to the pinions 86, 86a, 87 and 87a, the several transversely extending shafts are respectively additionally provided with the pinions 89, 89a, 90 and 90a (see Figures 8 and 9), the pinions 90 and 90a being respectively in toothed engagement with the reverse motion pinions 91 and 91a. Slidable within suitably formed grooves 93 formed in the bottom surface of the foundation board or platform 14 are the longitudinally slidable rack bars 92, these rack bars being held in position against vertical displacement from their respective grooves 93 by means of the cover plates 94 and 94a. The several rack bars are respectively in mesh with the pinions 89, 89a, 91 and 91a.

Connected to the forward extremity of each of the rack bars 92 is a cable 95, it being observed that four such cables are necessarily required, the portions of the cable which extend longitudinally of the foundation board 14 (see Figure 8) being arranged in laterally spaced parallel relation. As appears most clearly in Figures 1 and 9, the cables 95 respectively pass around a plurality of pulleys 96 which are journalled upon the forward edge of the foundation board or platform 14 and thence extend upwardly and over the pulleys 97, 97a, 98 and 98a, the free ends of the cables 95 being finally secured to the terminal ends of a plurality of hand-operated levers 99, 99a, 100 and 100a. Preferably, the last-mentioned end levers are arranged in pairs, the levers 99 and 99a constituting one pair, being mounted upon a short stub shaft 101 (as see Figure 12) which is suitably secured to for projection forwardly from the front face of the main body 1. The hand levers 100 and 100a, constituting the second pair, are similarly mounted upon a stub shaft which is preferably located vertically above the first-mentioned stub shaft.

Figures 9, 12:
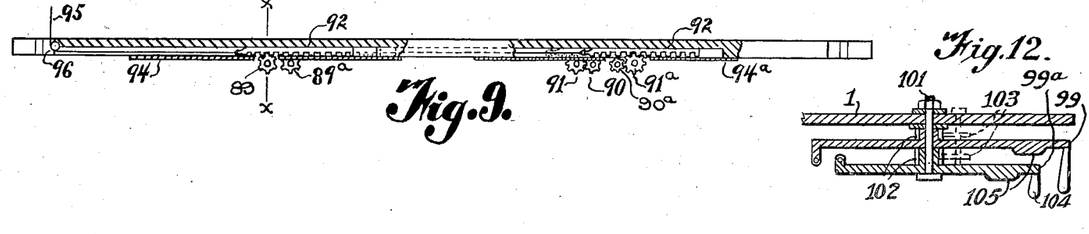
Fig. 9 is a side or edge view of the foundation board, partly in section.
Fig. 12 is a fragmentary horizontal sectional view showing the hand levers for operating the outlet trap doors.

As appears most clearly in Figures 3 and 12, each of the hand-operated levers 99, 99a, 100 and 100a is provided with a ratchet wheel 102, these ratchet wheels being adapted for respective engagement by the detents 103, it being understood, of course, that any suitable means or the like may be provided for normally maintaining said detents out of engagement with their respective ratchet wheels. As appears most clearly in Figures 1, 3 and 12, it will be observed that each of the hand-operated levers is provided with a hand grip 104 and that the arms of the levers 99 and 100 are respectively shorter than the corresponding arms of the levers 99a and 100a. This enables the operator to operate the levers independently of one another or simultaneously. The hand grips 104 of the lower pair of hand levers are adapted to be commonly grasped by one hand of the operator while the hand grips of the upper pair of hand levers are adapted to be commonly grasped by the other hand of the operator, thereby making it possible to operate all of the levers in unison whereby to open or close all of the trap doors in unison. Or, if desired, the several hand levers may be operated selectively, either individually or in pairs, to open or close any one or more of the trap doors 6 in the bottom of the main body 1. And it will be apparent, of course, that the opening or closing of these trap doors may be effected by the operator of the vehicle without leaving the driver's compartment through the medium of the hand-operated levers 99, 99a, 100 and 100a. If, however, the operator is standing on the ground upon one side or the other of the vehicle, the trap doors may be selectively opened or closed by operating one or the other of the hand wheels 88. As appears most clearly in Figure 12, the hand-operated levers are preferably weighted adjacent the grip ends thereof whereby to take up the cable slack when the bottom trap doors are opened or closed by means of the hand wheels 88.

As appears most clearly in Figures 1, 2 and 3 the front and rear ends of the main body 1 are preferably supported above the foundation board or platform 14 by means of vertically extending skeleton end supports 106—106 and suitably associated supporting crib work 212, said skeleton end supports and said crib work being all founded upon the foundation board or platform 14.

Still another means is provided for opening and closing the bottom trap doors 6, this latter means including a plurality of flexible cables 107 which are respectively terminally attached to the eyes 13 of the rack bars 11, the cables 107 being respectively passed over the pulleys 108 which are journalled in the foundation board or platform 14, the free ends of the several cables 107 being looped, as at 109, to provide hand grips by means of which the operator, standing upon the ground, may pull one or the other of the several cables 107 to open the desired trap door or doors 6 (see more particularly Figure 2).

As appears most clearly in Figures 1 and 2, the main body 1 has pivotally mounted at opposite sides thereof, as at 111 and 111, a pair of laterally spaced thrust arms 110, one such arm being provided for each cable 107. Each of the thrust arms 110 terminates in arcuately curved portions having an arcuated slot within which is adapted to be projected the pin 12 of the rack bar 11. A contractile spring 112 connects each thrust arm with a point with the main body 1, these springs serving normally to pull the several thrust arms 110 toward the body and in so doing causes the trap doors 6 to be respectively moved into closed position, this latter action being effected through the slot and pin connection between each thrust arm 110 and its associated rack bar 11.

It will be understood, of course, that as the trap doors 6 are pulled into open position by means of the cables 107, the transversely extending shafts 84, 84a, 85 and 85a (see Figure 8) will be correspondingly rotated, this being due to the fact that these shafts are respectively geared to the rack bars 11 of the trap doors 6. In order to positively maintain the doors 6 in open position for a considerable period of time, as when the entire load in the main body is to be discharged in a single operation, the said transverse shafts 84, 84a, 85 and 85a are respectively provided adjacent one or both ends of each thereof with a suitable ratchet and pawl device, the ratchet wheels being designated by the reference numeral 113 and the pawls or detents by the reference numerals 114 in Figure 8.

As appears most clearly in Figure 17, a supporting rail 115 is provided for use with the extension chute 22 or the like when it is not desired to employ the revoluble discharge chute 21. This chute supporting rail 115 is provided with a serrated or corrugated central section, the ends of this rail being adapted for removable securement to the bottom frame 2 defining the bottom discharge outlet of the main body. As appears in Figure 17 this chute supporting rail may be in the form of a straight section the opposite ends of which are provided with an upwardly projecting supporting arm, the chute so formed being adapted for connection to the frame 2 so that the corrugated edge thereof extends either longitudinally or transversely across any longitudinally or transversely arranged pair of the discharge openings 3. If desired, the chute supporting rail may be rectangular, circular or other such continuous outline with means for attaching the same to the bottom of the frame 2 in such manner that a chute may be suspended therefrom in any one of a number of positions, thereby affording communication between the chute and any desired one of the discharge outlets 3. It will be understood that the serrations or corrugations formed in the chute-supporting rail, when the chute hooks 116 (see Figure 6) are engaged therewith, prevent lateral displacement of the supported end of the chute. It will also be understood that the chute-supporting rail, be it of the type shown in Figure 17 or of the rectangular shape or curved shape, when properly attached to the frame 2 provides for intermittent use of a chute when the vehicle is being employed principally as an ordinary central drop load dump wagon. When the chute or supporting rail 115 is so employed, the revoluble discharge chute 21 is, of course, removed from the load receiving body.

As has already been observed, the extension chute 22 is provided with hooks at its rear end which are adapted not only for engagement with the supporting rail 115 aforesaid but also for engagement with a rail 119 carried by and extending across the bottom of the outwardly extending section of the revoluble discharge chute 21.

The side walls of the extension chute 22 are flared toward their rear end, the flared portions 118 of these side walls being respectively provided with laterally projecting hooks 23a respectively adapted for engagement with the chains 23 with which the revoluble chute 21 is equipped. The extension chute 22 is preferably employed when it is desired to discharge the load or portions thereof into receptacles to be filled, coal holes, troughs, tram cars and the like, all of which are located upon the ground when the body 1 is lowered. The end hooks 116 on the extension chute 22 are employed principally when the body is elevated and a long chute is required. The extension chute 22 being narrower in its main body portion and flared at its intake or receiving end 121 and being further provided with an end wall 122 extending between and interconnecting the flared side walls 123, constitutes a receiving member for the material being discharged wherein spilling of said material is greatly minimized. Preferably, the flared intake end of the extension chute is of sufficiently large dimension to embrace the hole of the discharge opening which is covered by the four bottom trap doors 6, thus permitting the use of this extension chute with or without the revolving discharge chute 21. Preferably, the discharge end of the extension chute 22 is provided with handles 210 or the like for facilitating its manipulation into the desired position.

As appears most clearly in Figures 1, 2, 3 and 7, the main body 1 is provided with a plurality of side loading doors 124, these doors being respectively adapted for movement in vertical planes, the doors being closed when they are moved into their uppermost position as shown in Figure 1. Preferably, a pair of such doors are arranged to either side of the main body in longitudinally spaced relation.

The mechanism for operating these side loading doors 124 will now be described. This mechanism generally includes a worm shaft 125 suitably journalled upon the frontal face of the main body 1 and having fixed to its outer free end a hand wheel 126 for effecting the rotation of said worm shaft in one direction or another (see more particularly Figures 1, 3 and 4). Pivotally secured to the bearing 127 within which the shaft 125 is journalled is a weighted detent 128, this detent being operative to automatically engage a pinion 129, the latter being meshed with the worm of the worm shaft 125. This pinion 129 is keyed to a transverse shaft 130 carrying at its outer extremity a worm 131 which is in mesh with a pinion 132 keyed to the end of a shaft 133 extending longitudinally along the side of the main body 1 immediately below the lower edges of the loading doors 124. This longitudinally extending shaft 133, as appears most clearly in Figure 1, is suitably journalled in bearing members 134 secured to the side of the main body 1.

The rear end of this longitudinally extending shaft 133 is connected, by means of the bevel gears 135 (see Figure 7), to one end of a transversely extending shaft 133a, the opposite end of this transversely extending shaft 133a being similarly connected, by means of the bevel gears 135a to a shaft 133b extending longitudinally along the opposite side of the main body 1. There is thus provided in effect a continuous shaft extending along one side of the main body, thence transversely of the rear end thereof, and thence along the opposite side thereof, it being understood, of course, that upon rotation in one direction or the other of the shaft section 133, a corresponding rotation is imparted to the longitudinally-extending shaft section 133b.

As appears most clearly in Figures 1 and 3, each of the longitudinally extending shaft sections 133 and 133b is provided with a pair of longitudinally spaced bevel gears 136, these latter bevel gears being respectively in mesh with bevel gears 136a secured to and carried by the lower ends of a plurality of vertically arranged screws 137. These screws 137 are suitably journalled adjacent their respective upper and lower ends in bearings 138 suitably mounted upon the side walls of the main body 1. It will be observed that a pair of screws 137 is provided for each loading door 124. It will furthermore be observed that the upper ends of each screw 137 engages an interiorly threaded socket or collar 139 which is suitably formed in an arm or bracket fastened to each upper corner of each loading door 124. Preferably, the upper ends of the vertical screws 137 are smooth-surfaced or threadless and slightly tapered, each of said tapered, smooth portions of the screws 137 being provided with a coil spring 140. The lower ends of the screws are correspondingly formed and equipped with coil springs 141 (see more particularly Figures 1 and 3). These coil springs 140 and 141 operate as automatic shut-off or safety devices when the loading doors are completely opened or closed regardless whether the power is applied or not. Thus, when the actuating power is applied to close the loading doors 124, this being effected, of course, by proper manipulation of the hand wheel 126, the bottom springs 141 operate automatically to effect the necessary threaded engagement between the several vertical screws 137 and their respective fixed sockets or collars 139, it being apparent that continued rotation of the hand wheel 126 in the proper direction will so impart rotation to the screws 137 as to cause the sockets 139 to move upwardly therealong, thereby carrying the doors 124 into their upper and closed position. As appears most clearly in Figures 1, 3 and 7, the loading doors 124 are guided in their vertical movements by vertically disposed guide strips 142 suitably secured to opposite faces of the vertical side walls of the main body 1 to provide a plurality of pairs of opposed channels within which the opposite vertical edges of the loading doors are received. It will be apparent that the arrangement just described permits the simultaneous operation of all of the load doors 124 from the front end of the vehicle, this operation being possible regardless whether the main body 1 is in raised or lowered position.

It is preferable to provide some means for subdividing the main body 1 into a plurality of individual compartments and to this end there is provided a pair of vertical sections 144 and 145 and a second pair of vertical sections 146 and 147, these vertical sections being so formed along their inner vertical edges as to permit their slidable retention within suitably formed vertically extending slots, grooves or channels 148 provided in a central vertical post 149 (see more particularly Figures 13 and 14), this central vertical post 149 serving to detachably secure the division wall sections 144 to 147 together. Suitable bifurcated lugs 150 or the like are secured to the inner faces of the side walls of the main body 1 for respectively receiving the outer edges of the division wall sections 144 to 147, these lugs 150 being preferably provided with set screws 151 or the like for rigidly securing and retaining the division wall sections in position. As appears quite clearly in Figure 7, the division wall sections when properly positioned within the main body 1 constitute in effect a longitudinally extending partition which is intersected substantially at right angles by a transversely extending partition, the longitudinally extending partition being disposed substantially in the plane of the division strip 4 of the bottom frame 2 and the transversely extending partition being disposed substantially in the plane of the transversely extending division strip 5 of the bottom strip 2. There is thus provided four compartments which are respectively provided with the discharge openings 3 (see Figure 20), each of which openings is provided with its own individually operated trap door 6, as already described. The four compartments so provided are thus adapted to be filled with different materials for individual or selective discharge through their respective discharge openings or the four compartments may be filled with material adapted to be discharged in one operation by simultaneously opening all of the trap doors 6. Preferably, the upper edges of the division strips 4 and 5 of the frame 2 surrounding the bottom opening in the main body 1 are grooved or slotted longitudinally thereof to snugly accommodate the bottom edges of the division wall sections 144 to 147.

Figures 13, 14, 15:
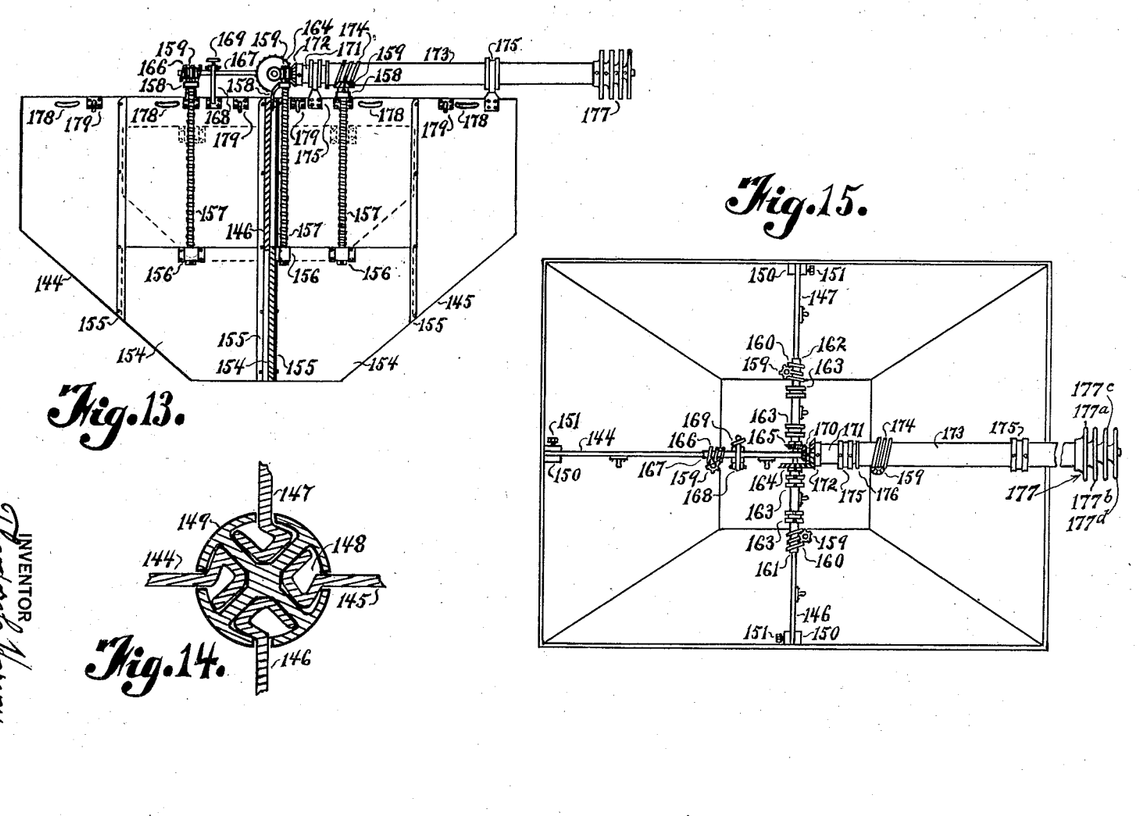
Fig. 13 is a side elevational view of the displaceable, longitudinal, center or division board and gate operating means.
Fig. 14 is a top cross-sectional view of the central, grooved or channeled binding post for engaging the central ends of the four division wall sections.
Fig. 15 is a top plan view of the dump body, division walls and division wall gate operating means.

As appears most clearly in Figures 13 and 15, each of the division wall sections 144 to 147 is provided in the bottom thereof with a vertically movable gate 154. Each of these gates 154 has fixed adjacent the upper edge thereof an interiorly threaded socket 156 or the like through which is vertically projected a vertically extending screw 157, this screw being suitably journalled in a bearing 158 secured to the upper portion of the division wall section. Fixed to the upper end of each screw 157 is a pinion or gear wheel 159, the pinions 159 so carried by the vertical screws of the transverse division wall sections 146 and 147 respectively engaging suitable worm gears or the like 160 carried by short shafts 161 and 162. These shafts 161 and 162 extend in opposite directions from the central axis of the main body 1 and are journalled for rotation in suitable bearings 163 mounted upon the upper edges of the transverse division wall sections 146 and 147. As appears most clearly in Figure 15, the proximate ends of the shafts 161 and 162 are respectively provided with pinions or gear wheels 164 and 165.

Extending longitudinally of the main body 1 and lying substantially in the plane of the division wall sections 144 and 145 is a shaft 167, this shaft being provided with a screw or worm gear 168 for meshing engagement with the pinion 159 of the screw 157 carried by the forward division wall section 144. The forward portion of the longitudinally extending shaft 169 is supported within a split bearing mounted upon the upper edge of the forward division wall 144, one portion of this bearing being hinged to the other portion thereof whereby the bearing may be opened to permit the removal of the shaft. The split bearing is preferably maintained closed by means of a thumb screw 169 or the like. The longitudinally extending shaft 167 is projected through a second tubular shaft the forward end of which is provided with a bevel gear or pinion 170 adapted for meshing engagement with the bevel gear or pinion 165 carried by the short transversely extending shaft 162. This second tubular shaft 170, is in turn projected through a third tubular shaft 171, the forward end of which is also provided with a bevel gear or pinion 172 adapted for meshing engagement with the bevel gear or pinion 164 carried by the other transversely extending shaft 161. The last-mentioned tubular shaft 171 is projected through still another tubular shaft 173, the latter being provided at a somewhat removed distance from its forward end with a worm or other such gear 174 which is adapted for meshing engagement with the bevel gear or pinion 159 fixed to the upper end of that vertically extending screw 157 which is carried by the rearward division wall section 145.

It will thus be observed that the central shaft 167 and the three tubular shafts embracing the same are all coaxially arranged with respect to each other, the outermost shaft being of shortest length and the innermost central shaft being of greatest length. This coaxial shaft assembly is suitably supported or journalled within bearings 175—175 in longitudinally spaced relation upon the upper edge of the rearward division wall section 145. Preferably, the central shaft 167 and the tubular shafts surrounding the same are separated from each other by suitable ball or roller bearings.

Respectively secured to the rear ends of these four coaxially arranged shafts are the hand wheels 177a, 177b, 177c and 177d, it being apparent that upon rotation of the hand wheel 177a, the gate in the rearward division wall section 145 may be lifted vertically. Similarly, by operating the hand wheel 177c the gate in the division wall section 146 may be vertically raised or lowered, while operation of the hand wheels 177b and 177a respectively effect vertical movement of the gates in the division wall sections 147 and 144.

Preferably, the division wall sections each are provided with hand holes 178 (see Figure 13) to permit the removal of these sections by means of an overhead crane or tackle. By means of the selectively movable gates 154 in the several division wall sections 144 to 147, the operator of the vehicle may readily stabilize the load contained in the main body 1 after a part of this load has been delivered or he may speed up the discharge of the load, as when only one of the four compartments is filled with a slow-moving material and it is desired to make available all four of the bottom discharge outlets 3, it being obvious in such case that when all of the gates are raised the discharge of the material from the single-filled compartment will be greatly accelerated.

Referring now again more particularly to Figure 1, it will be observed that the foundation board or platform 14, when in its lowered position, is yieldably supported by a plurality of weighing springs 181 founded upon the vehicle frame 16. In general, the weighing mechanism comprises a stationary dial 182 (see Figures 1 and 11), with which is operatively associated an indicating hand 183 carried by a rotatable arbor actuated by a vertically extending movable rack bar 184. As shown in Figure 11, the rack bar 184 is telescoped within a tubular member 185 which is maintained in longitudinally adjusted position relatively to the rack bar 184 by means of a set screw 186. This enables the length of the actuating member of the weighing mechanism to be adjusted in length. The rack bar 184 is projected through a lock box 187 within which is housed the set screw 186. This lock box 187 is provided with an openable door 188 which may be locked to prevent unauthorized persons from tampering with the adjustment of the actuating member of the weighing mechanism. In this manner the proper official may adjust the weighing mechanism and then lock and seal the same.

As appears most clearly in Figures 1, 2, 18 and 19, a plurality of riding blocks 189 are employed for supporting the foundation board or platform 14 at an elevation sufficiently above the vehicle frame as to render the weighing mechanism inoperative. In other words, while the vehicle is being driven from place to place, these riding blocks 189 are operative to relieve the weighing springs 181 of the weight of the platform 14, the main body 1 carried thereby and the load contained in said main body. These riding blocks 189 are normally held in the body sustaining position by means of springs 191, one such spring being employed for each riding block and each spring being adapted to normally pull its associated riding block into the necessary vertical position for supporting the platform 14. When it is desired to transfer the platform and the body supported thereon from the riding block to the weighing springs 181, the former are pulled into substantially horizontal position by means of the flexible cables 192 which are respectively secured to the riding blocks and pass around pulleys 193 suitably journalled in the vehicle frame member 16. Preferably, all of the cables 192 are joined together, as at 194, (see Figure 19) and are then commonly passed over the guide pulleys 195 and 196 for connection to a hand-operated lever 197 (see Figures 1 and 19), the latter being mounted at one side of the driver's seat. This lever is of the usual thumb-latch type including an arcuated toothed segment and an associated detent for maintaining the riding blocks 189 in their depressed position during the weighing of the load. When the lever 197 is returned to its non-weighing position the riding blocks assume their upright positions in which positions they support the platform 14 and relieve the weighing mechanism of any and all strain.

The actuating member 184—185 of the weighing mechanism projects downwardly through a suitable opening 211 formed in the extension 209 of the foundation board 14 (see Figure 8) and is adapted for contacting engagement with the top surface of the vehicle frame member 16. The front riding block is preferably slotted, as as 198, to permit the block to be depressed into its horizontal position without interfering with the downwardly projecting actuating member of the weighing mechanism. The weighing mechanism is preferably disposed centrally between the opposite sides of the vehicle so as not to interfere with the free movement of the thrust arms 110 employed for actuating the horizontally movable bottom trap doors 6.

As appears most clearly in Figures 1 and 5, the revoluble chute discharge 21 is provided with a circumferentially extending downwardly turned flange 199 the bottom edge of which constitutes a continuous circular track for rotatably supporting the discharge chute upon rollers or pulleys 200 which are suitably journalled in brackets 201 bolted or otherwise secured to the bottom surface of the foundation board or platform 14. When it is not desired to employ the revoluble chute discharge, the same is readily removed from its operative position as shown in Figure 1 simply by loosening several of the bracket bolts thereby permitting the rollers or pulleys 200 to be moved out of engagement with the track 199 and consequently permitting the removal of the revoluble discharge chute bodily from the vehicle.

Figure 7:
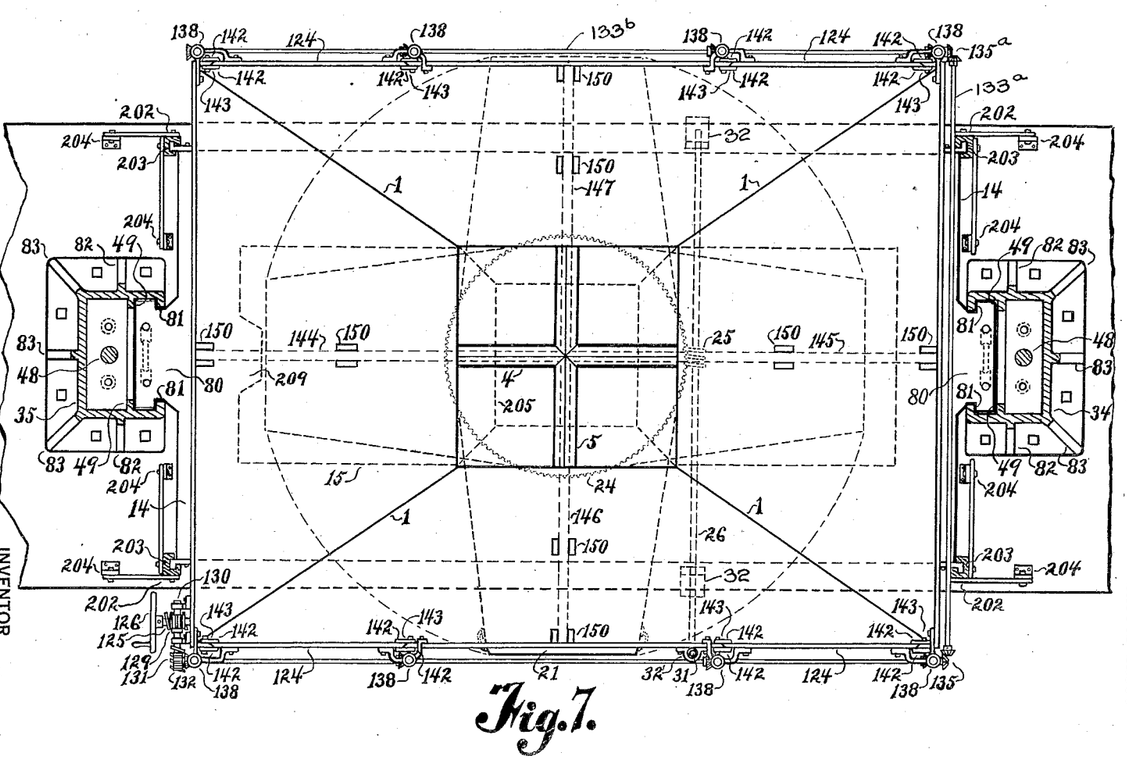
Fig. 7 is a plan view of the dump wagon embodying the present invention, the fore and aft standards being shown in horizontal section as taken along the line B—B of Fig. 3.

In addition to the supports for the main body 1 which have hereinbefore been described, this body is further supported by crib work 202 shown most clearly in Figures 3 and 7, the corner posts of which are suitably ribbed or grooved to constitute vertical guides for the corner lugs 203 (see Figure 7), fastened to each corner of the foundation board or platform 14. The crib work for supporting and guiding the foundation board or platform 14 during its upward and downward movement are suitably and rigidly founded upon the vehicle frame member 16 by bolts or rivets 204.

In order to conserve space and prevent spilling in connection with the use of the revoluble chute discharge 21, a demountable frame 205 is employed (see Figures 2 and 7), this frame being provided with sloping side walls which converge downwardly to form a bottom opening disposed substantially in a horizontal plane lying below the upper edge of the discharge chute 21. This frame, which practically encompasses the four discharge openings 5, is secured in position to cross pieces within the foundation board or platform 14 by means of bolts 206. When it is desired to employ the body for regular drop load purposes, the frame 205 together with its associated revoluble chute discharge 21 are readily removed by the simple expedient of removing the bolts 206.

Referring again to the elevation standards 34 and 35, it will be observed that the vertical lift screws 48 are each provided at their upper and lower ends with smooth-surfaced or non-threaded portions, these portions being slightly tapered and accommodating coiled springs 208. These springs 208 operate like those on the screws for actuating the side loading doors to serve as safety devices in limiting the vertical movement of the body in either direction. Thus, should the actuating power not be cut off when the body reaches its lowermost or uppermost position, the smooth-surfaced portions of the screws continue to rotate freely within the cable blocks 42 without, however, effecting any further movement of the latter in one direction or the other. When the power is reversed, however, the springs 208 are operative instantly to force the blocks 42 into threaded engagement with the screw 48 whereupon further rotation of the screws will cause the blocks 42 to travel axially thereof to either raise or lower the body as the case may be.

From the foregoing description, when considered in connection with the accompanying drawings, it will be observed that a vehicle has been produced by which the load may be weighed with the vehicle disposed for discharging the load from either the front or rear end thereof or from either side thereof. The provision of the enclosed revoluble chute discharge permits of a wide range of service, particularly when it is employed in connection with the flared extension chute, spilling of the discharge load being reduced to a veritable minimum. Furthermore, the revoluble chute discharge permits the load to be discharged in a lowered position, it being possible to direct the discharge load to a point either within or without the external lines of the vehicle frame. This is a particularly desirable feature in all such instances wherein it is necessary that the discharge load be clear of the vehicle wheels so as not to hinder the free movement of the vehicle in either direction once the load has been discharged. Furthermore, when the revoluble chute discharge is removed, the load may be discharged directly from the bottom of the main body or it may be directed to either side thereof by way of an extension chute suitably supported by the chute rails which are adapted to be attached to the bottom of the body as hereinbefore described.

The body is self-emptying either in its elevated or lowered position, it being apparent that the entire body may be readily raised or lowered either by hand or by motor without spilling any of the load. Also, the outlet trap doors in the bottom of the main body are adapted to be operated from the seat selectively and individually, or in pairs, or they may be all operated simultaneously. Furthermore, these trap doors may be operated from the ground and with the body in either elevated or lowered position. Similarly, the side loading doors as well as the riding blocks are adapted to be operated by the driver while seated in his driving compartment. The division wall sections which sub-divide the main body into a plurality of separate and independent compartments allow for single or multiple delivery at the same time that they provide a very effective means for stabilization of a part load in order to afford safer transit over rough roads. The vertically movable gates in these division wall sections facilitate not only this stabilization of the load but also may be employed for accelerating the discharge of a slowly moving material. In addition to the foregoing, a weighing mechanism has been provided which may be adjusted officially and thereafter locked and sealed, thereby providing protection against unauthorized tampering therewith by unscrupulous persons. Also, by virtue of the arrangement of the supporting crib work for the body and within which the foundation board is guided in its vertical movement, it is not possible for the body to drop from an elevated position unless the lifting cables at opposite ends of the vehicle break simultaneously.

It will be understood, of course, that the invention is susceptible of various changes and modifications which may be made from time to time without departing from the real spirit or general principles thereof and it is accordingly intended to claim the same broadly, as well as specifically, as indicated in the appended claims.

What is claimed as new and useful is:—

1. A dump wagon of the character described comprising, in combination, a main body constituting the load receptacle, said body being provided with a downwardly converging bottom section and an upper section extending above the plane of the upper edge of said converging bottom, a sectional lay shaft extending longitudinally along the opposite sides and transversely across the rear of said main body, a plurality of vertically slidable side loading doors provided in the sides of the upper section of said main body, vertically disposed screw means carried by said upper section of the main body and disposed to either side of each side loading door for operative association therewith, said screw means being commonly actuated by said sectional shaft, and means arranged at the fore end of said main body and carried thereby for effecting the rotation of said sectional shaft in one direction or another to effect the simultaneous movement of said side loading doors upwardly or downwardly as the case may be.

2. A dump wagon of the character described comprising, in combination, a main body having substantially vertically extending side, rear and front walls and a downwardly converging bottom, the latter terminating in a bottom discharge opening, a plurality of substantially vertically slidable side loading doors respectively arranged in the opposite side walls of said main body, a pair of opposed guide channels provided in said side walls for each of said side loading doors, vertically arranged screw means carried by said main body side walls and operatively associated with each of said side loading doors to effect the upward and downward movement thereof, and manually operable means located at one end of said main body for commonly actuating said screw means whereby to simultaneously effect the movement of said side loading doors either upwardly or downwardly.

3. A dump wagon of the character described comprising, in combination, a main body constituting the load receptacle, said body being provided with a downwardly converging bottom terminating in a discharge opening, a plurality of substantially vertically slidable side loading doors arranged immediately above the horizontal plane of the upper edge of said converging bottom, gear operated screw means for effecting the vertical movement of said side loading doors, and means operatively associated with said screw means for permitting the free rotation of the latter when the doors have been moved into their normal fully closed or opened positions, whereby upon continued operation of said screw means the latter is ineffective to move said doors beyond said normal positions.

4. A dump wagon of the character described comprising, in combination, a main body constituting the load receptacle, said body having upwardly extending side walls, loading doors arranged in opposite walls of the main body for sliding movement respectively in the planes of said side walls, a pair of guides provided in said side walls for each of said doors, screw means for effecting the sliding movement of said doors into closed and opened position said screw means including for each loading door a pair of vertically disposed screws journalled upon the said side walls to each side of each door, and means commonly operative upon said screw means for simultaneously opening or closing all of said loading doors.

5. In a dump wagon of the character described, in combination, a main body constituting the load receptacle, said body having upwardly extending side walls, side loading doors respectively arranged in opposite side walls of the main body for sliding movement in the planes thereof, screw means operatively associated with each side loading door for sliding it into closed or open position, means operative automatically to render said screw means ineffective to move said doors beyond their fully closed or fully opened positions, and means for insuring the positive actuation of said screw means to initiate the movement of said doors out of their fully closed or opened positions.

THEODORE C. HARVEY.